(12) United States Patent
Clauter et al.

(10) Patent No.: US 8,993,103 B2
(45) Date of Patent: Mar. 31, 2015

(54) PROCESS FOR CREATING THREE-DIMENSIONAL PATTERNS IN COATINGS

(75) Inventors: Peter Clauter, Pfungstadt (DE); Thomas Goetz, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/994,464

(22) PCT Filed: Nov. 17, 2011

(86) PCT No.: PCT/EP2011/005804
§ 371 (c)(1),
(2), (4) Date: Jun. 14, 2013

(87) PCT Pub. No.: WO2012/079674
PCT Pub. Date: Jun. 24, 2012

(65) Prior Publication Data
US 2013/0288024 A1    Oct. 31, 2013

(30) Foreign Application Priority Data
Dec. 15, 2010    (DE) .......................... 10 2010 054 528

(51) Int. Cl.
| | |
|---|---|
| B32B 3/00 | (2006.01) |
| B44C 1/24 | (2006.01) |
| B32B 3/26 | (2006.01) |
| B44F 1/14 | (2006.01) |
| B44F 7/00 | (2006.01) |
| B44F 9/08 | (2006.01) |
| B42D 25/29 | (2014.01) |

(52) U.S. Cl.
CPC . B44C 1/24 (2013.01); B32B 3/263 (2013.01); B42D 2033/20 (2013.01); B42D 2035/20 (2013.01); B44F 1/14 (2013.01); B44F 7/00 (2013.01); B44F 9/08 (2013.01); B42D 25/29 (2013.01)

USPC .......... 428/195.1; 428/207; 101/3.1; 427/256

(58) Field of Classification Search
CPC ............ B32B 3/00; B32B 3/263; B32B 3/30; B41F 5/24; B41M 1/04; B41N 1/06
USPC .................. 428/195.1, 207; 101/1.3; 427/256
See application file for complete search history.

(56) References Cited

U.S. PATENT DOCUMENTS

| | | |
|---|---|---|
| 2009/0084278 A1 | 4/2009 | Masi et al. |
| 2010/0037326 A1 | 2/2010 | Batistatos et al. |

FOREIGN PATENT DOCUMENTS

| | | |
|---|---|---|
| DE | 10 2006 018099 | 11/2007 |
| EP | 0 532 340 | 3/1993 |
| EP | 1 879 154 | 1/2008 |
| WO | WO-01 85473 | 11/2001 |
| WO | WO-2005 049745 | 6/2005 |
| WO | WO-2008 031170 | 3/2008 |

OTHER PUBLICATIONS

International Search Report for PCT/EP2011/005804, Date of the actual completion of the international search: Mar. 20, 2012, Date of mailing of the international search: Mar. 30, 2012.

Giesecke & Devrient GmbH, "Method for manufacturing a safety element," Espacenet, Publication Date: Jan. 16, 2008; English Abstract of EP-1 879 154.

Schulte Guido, "Floor covering for panels with different decoration has a base plate with a multilayer coating with fancy particles on its visible side," Espacenet, Publication Date: Nov. 8, 2007; English Abstract of DE-10 2006 018099.

*Primary Examiner* — Elizabeth Mulvaney
(74) *Attorney, Agent, or Firm* — Millen, White, Zelano & Branigan, P.C.

(57) ABSTRACT

The present invention relates to a process for the production of three-dimensional patterns in coatings which comprise flake-form effect pigments, to patterned coatings produced thereby and to the use thereof in decoration and security products.

18 Claims, 3 Drawing Sheets

PROCESS FOR CREATING THREE-DIMENSIONAL PATTERNS IN COATINGS

The present invention relates to a process for the production of three-dimensional patterns in coatings which comprise flake-form effect pigments, to the coatings produced thereby and to the use of products which have such coatings.

Decorative three-dimensional coatings, in particular on domestic consumer goods, such as wallpapers, decoration films and floor coverings, are known and have already been used for some time. They give the said goods an exclusive appearance, which suggests depth and differs from conventional patterns in an advantageous manner. For their production, flake-form effect pigments are also used in some cases. The substrates and/or the layers comprising the pigments are frequently embossed or otherwise structured in order ultimately to have a three-dimensional pattern. Such structuring is, however, frequently associated with high equipment complexity, since embossing dies and other complex structuring measures have to be integrated into the process sequence of product production, which is, in particular, then associated with effort and costs if the structured layer is subsequently to be coated further.

If the embossed layer is, by contrast, the uppermost layer of the coating, the surface structures, which are often deep, can be clearly felt and are thus particularly striking, but on the other hand the recesses formed are exposed to environmental influences, such as dust, other dirt or also mechanical loads, so that the optical appearance drops in quality in the course of time.

Thus, for example, U.S. Pat. No. 4,675,212 discloses a process for the production of decorative coatings in which a plurality of layers are applied one on top of the other. The application here can also take place in printing processes. Decorative pigments (pearlescent pigments, metal pigments) are employed in the uppermost layer and are applied as a pattern. In order, in spite of the production of three-dimensional patterns, to be able to restrict the amount of these pigments employed, the overall multilayered structure is subsequently embossed in such a way that the decorative pigments are located on the non-embossed parts of the surface, while the parts of the surface not printed with pigments form a three-dimensional pattern. In this way, both pearlescence and also an embossed pattern can be achieved. The three-dimensional effect here is produced solely by the embossing, while the effect pigments remain oriented parallel to the surface of the product. A product produced in this way has the disadvantages already outlined above with respect to the external influences on the embossed surface. In addition, special embossing dies have to be employed in order to be able to provide the overall multilayered structure with an embossing.

GB 2 272 848 A discloses a decorative surface coating which comprises a plastisol-containing layer, in which flake-form material is uniformly distributed, on a substrate. This layer is partially coated with a further plastisol, which cures and is subsequently pressed into the layer comprising the flake-form material under the action of heat and pressure. In this way, the flake-form pigments present in the underlying layer are rotated out of their parallel orientation and form a spatial pattern. This multilayered structure can then be coated further. However, the process is tied to the use of plastisols and requires the action of heat and increased pressure in order to emboss the layer comprising the flake-form pigments. In addition, it appears impossible, due to the type of embossing, to be able to produce precise patterns with fine structures.

Furthermore, coatings are also known which comprise flake-form magnetic pigments, where the magnetic pigments are rotated out of their orientation by the action of a magnetic field and in this way three-dimensional patterns are formed. Magnetisation units of this type can be readily incorporated, for example, into single- or multistep printing processes, since the still-moist printed layers are subjected to the magnet action. However, very high machine requirements have to be satisfied for the production of mass-produced articles, in particular with respect to the adaptation of the machines to the requisite duration of the orientation time of the pigments and the subsequent drying and storage processes.

EP 428 933 B1 describes materials for security printing which have a coating which has a structuring caused by flake-form pigments with different orientations in different regions. The pigments employed may also be magnetically alignable. The optical effects obtained due to the structured coating cannot be copied and are therefore highly suitable for security applications. However, the document mentioned does not describe an industrially applicable process with the aid of which mass-produced articles can be produced simply.

The object of the present invention consists in providing a process for the production of three-dimensional patterns in coatings which can readily be employed for the production of mass-produced articles, can readily be integrated into existing coating processes, in particular into printing processes, does not require any arrangements for the magnetic alignment of flake-form pigments, produces readily visible three-dimensional patterns without significantly embossing the coated surface, and which can be used in the case of coatings which may comprise virtually all known types of flake-form effect pigments.

A further object of the present invention consists in providing a coating which may comprise flake-form effect pigments of a very wide variety of types and has a readily visible, but non-tactile pattern with a three-dimensional appearance.

The object of the invention furthermore consists in providing a product which has, on a surface which may consist of multifarious materials, a coating which itself has a pattern with a three-dimensional appearance.

A further object of the present invention consists in indicating the use of the products described.

The object of the present invention is achieved by a process for the production of three-dimensional patterns in coatings in which a flowable coating composition is applied to a substrate with formation of a first layer, and the first layer in an unsolidified state is brought into contact with a die which has a surface with raised elements in such a way that the raised elements of the die produce recesses in the first layer, the die is removed, and optionally the first layer containing recesses is coated with a second coating composition with formation of a second layer, where at least one of the coating compositions comprises flake-form effect pigments, the die is a printing plate for a relief printing process, the recesses in the first layer are not deeper than 10 μm, and the layer(s) is (are) solidified.

The object of the present invention is also achieved by a coating on a substrate which has a three-dimensional pattern and consists of a first solidified layer and optionally a second solidified layer, where at least one of the layers comprises flake-form effect pigments and where the first layer has recesses which are not deeper than 10 μm, where the coating is obtainable by the process described above.

Furthermore, the object of the invention is achieved by a product which has a surface which has a three-dimensional pattern, produced by the process described above, in a coating on a substrate made of paper, cardboard, wallpaper, a laminate, a tissue material, wood, a polymer, a metal, a polymeric film, a metal foil, a security-printing product or made of a material which comprises constituents comprising a plurality of these substances, and where the substrate has optionally been electrostatically pretreated and/or provided with a primer layer and/or another anchoring layer.

In addition, the object of the present invention is also achieved by the use of the product described above as decoration material or security product.

The process according to the invention serves for the production of three-dimensional patterns in coatings which comprise flake-form effect pigments. The present invention therefore relates to a process for the production of three-dimensional patterns of this type.

A conventional substrate, as described in greater detail below, is provided here with a flowable coating composition.

The degree of fluidity of the coating composition here is determined by the type of application method. As is generally known, various conventional application methods are viscosity-dependent, meaning that the viscosity of a coating composition has to be adjusted depending on the type of application method and the apparatuses belonging thereto. However, this adjustment is familiar to the person skilled in the art and does not require an inventive step. The viscosity of a coating composition here is inversely proportional to its fluidity. If a low-viscosity flowable coating composition is applied to the substrate, the viscosity increases during the drying or solidification operation that then commences, until, after some time, a high-viscosity, i.e. still flowable and thus also still shapeable, coating is formed, which is subsequently converted into a solid or solidified, i.e. dry and no longer flowable, coating. In the case of high-viscosity coating compositions, the first solidification step is superfluous, the coating composition remains, depending on the materials employed, in a shapeable state for only a relatively short time. Depending on the drying or solidification method employed (supply of heat, curing accelerator, UV drying, oxidative drying), the entire solidification and drying operation can also proceed within very short time spans (tenths of seconds).

In the process according to the present invention, a coating which is located on a substrate in a low-viscosity state which is unsolidified (or not yet solidified), i.e. is still flowable and shapeable, but generally not or no longer low-viscosity, is then brought into contact with a die which has raised elements on its surface, where, in accordance with the invention, this die is a printing plate for a relief printing process. The totality of the raised elements (two-dimensional shaping) on the surface of the printing plate, more precisely on the part of the surface of the printing plate which is brought into contact with the first layer, represents the pattern to be transferred (two-dimensional shaping) in mirror-image form. To this extent, this corresponds very substantially to the way in which patterns are generally transferred to a substrate using relief printing plates, see the following explanation.

The surface of relief printing plates usually has raised elements which are located at the same height level and whose outward-facing surface is covered with a printing ink, which is subsequently transferred to a material to be printed. The mirror image of the surface of the raised elements on the surface of the printing plate is thus formed on the material to be printed.

Suitable relief printing plates for the process according to the invention are the printing plates used in conventional relief printing processes, such as letterpress printing, letterset printing and flexographic printing, where flexographic printing plates are preferred, inter alia owing to their flexibility. The printing plates used are usually flat printing plates or printing cylinders.

In contrast to a conventional relief printing process, in the process according to the invention no printing ink is transferred on contact of the printing plate with the surface of a material to be printed. The material to be printed is likewise not a conventional medium, such as paper, cardboard, polymer film or the like, but instead a substrate coated (preferably freshly) with a flowable layer which has not yet dried or otherwise solidified, where, in accordance with the invention, the raised elements on the relief printing plate penetrate into this (first) layer to a depth of up to 10 µm. This corresponds to the principle of, albeit slight, wet embossing of the first layer, without the substrate also being embossed in the process. The printing plate is subsequently removed. Since the first layer is still in a flowable, but preferably no longer low-viscosity state, the pattern produced in this way, which, in contrast to the two-dimensional patterns transferred in conventional relief printing processes, is a three-dimensional pattern (shape of the surface of the raised elements with a penetration depth up to 10 µm), is retained in the layer, before this is finally solidified. Alternatively, a low-viscosity coating composition can also be deformed by the contact with the raised elements of a relief printing plate and solidified immediately thereafter (for example by UV or electron-beam curing) if the thickness of the applied layer is sufficiently thin in order to be able to be cured through immediately after removal of the relief printing plate.

In accordance with the invention, the recesses in the first layer which has not yet solidified are not deeper than 10 µm, preferably not deeper than 5 µm. These recesses may be somewhat flattened out, i.e. have a lower depth than 10 µm in the solidified first layer, on solidification of the first layer due to slight flow of the embossed contours of the raised elements of the printing plate. Since, in accordance with the invention, relief printing plates are used for the production of the recesses in the first layer, the depth of all recesses in the first layer is virtually identical. It is thus ensured that the visibility of the three-dimensional pattern is ensured equally well at any desired point of the pattern-carrying coating and that there are no deep embossings in the first layer, which would favour accumulation of dirt in these embossings on subsequent use of the coated products.

The depth of the recesses in the first solidified layer is from 1 to 10 µm, preferably from 1 to 5 µm, in particular from 1 to 3 µm. Recesses of this type are so slight that they are non-tactile to humans, i.e. cannot be felt as embossings on touching or moving over the first layer embossed in accordance with the invention with a human body part, preferably a finger or a hand.

The solidification of the first layer having the recesses is carried out by conventional methods, such as drying and/or curing, depending on the type of binder systems employed. The drying and/or curing process here can be supported as usual by the supply of heat, air or protective gases and/or exposure to light of various wavelengths, particularly preferably to UV radiation. If only one first layer is present, the solidification of this layer is preferably carried out immediately after the introduction of the recesses into the layer. If a second layer is to be applied to the first layer, the solidification of the first layer can be carried out before the application of the second layer, but also simultaneously with the second layer already applied. The preferred method is selected here depending on the existing mechanical strength of the recesses in the first layer and also on the desired application method for the second layer. In general, however, it is advantageous for the first layer to be solidified before the second coating composition is applied.

The first layer in the process according to the invention has a thickness (wet thickness) of 1 to about 40 μm, preferably from 2 to 30 μm and in particular from 2 to 15 m. It goes without saying here that the wet thickness of the first layer is not less than the recesses produced in accordance with the invention in the first, still unsolidified layer. In the extreme case, the wet layer thickness of the first layer corresponds to the depth of the recesses in precisely this first layer. However, the wet thickness of the first layer is usually greater than the depth of the recesses in this layer. The same also applies in each case to the dry layer thickness of the first layer in relation to the recesses in the solidified first layer.

It is obvious that the wet layer thickness of the first layer is determined to a crucial extent by the method by which this layer is applied to the substrate to be coated.

Suitable coating methods for the application of the first layer here are all coating methods usual in the art which produce a moist, shapeable coating having adequate wet layer thickness on a substrate to be coated. For this purpose, conventional coating methods, but also printing processes, can advantageously be employed.

The processes are preferably printing processes, for example a gravure printing process, a screen printing process, paper coating process, a flexographic printing process, a pad printing process, an offset printing process or an offset overprint varnishing process.

However, likewise conventional coating methods, such as a lacquering method, a spray lacquering method (air brush, spraying), a coil coating method or a reverse-roll coating method, can also be employed.

Particular preference is given to a flexographic printing method or an offset overprint varnishing method for the application of the first layer.

The application of the first layer to the substrate to be coated is carried out over the entire surface, at least in the region which is to be provided with the three-dimensional pattern in accordance with the present invention. This region may of course also only represent a part-region of the entire surface of a substrate if only parts of the surface of the substrate are to be provided with a three-dimensional pattern produced in accordance with the invention.

Suitable substrates are all conventional materials which are usually employed as base or support materials for decorative and security products. Accordingly, the substrate employed in accordance with the invention is preferably paper, cardboard, wallpaper, a laminate, a tissue material, wood, a polymer, in particular a polymeric film, a metal, in particular a metal foil, a security printing product or a material which comprises constituents comprising a plurality of these substances. As is generally usual, in particular, in the case of papers and polymer films, the substrate may optionally also have been electrostatically pretreated and/or provided with a primer layer and/or another anchoring layer. Such measures are generally known to the person skilled in the art and are usual in the art and therefore do not require further explanation.

The first layer may optionally also be coated with a second coating composition, which is subsequently solidified, if necessary. In this way, a second layer is formed on the first layer. Suitable methods for the application of the second layer are the printing and coating methods already described above. In addition, however, a so-called bronzing method can also be employed. An effect-pigment powder is usually applied directly, i.e. dusted, sprayed, wiped, or the like, to a still-moist binder layer. If this method for the application of a second layer according to the invention is selected, in principle two variants are available. In a first variant, the still-moist, i.e. still incompletely solidified first layer can serve as the basis for the direct application of effect pigments, i.e. the binder system of the first layer forms the basis for the effect pigments of the second layer which are applied in pure form. In this case, the second layer consists virtually exclusively of flake-form effect pigments. In a second variant, firstly a binder system is applied as second layer to the already solidified first layer, and this is subsequently coated, as described above, in the not yet dried or solidified state with an effect-pigment powder. In this case, the second layer is itself formed in two parts. In the subsequent drying or solidification operation, the loose effect pigments applied to the surface for the most part remain adhering to the area coated with binder. The excess pigment is preferably removed mechanically after solidification of the layer.

At least one of the coating compositions, and thus also the first layer and/or second layer, comprises flake-form effect pigments. This is likewise intended to apply to the above-described case of the two-part formation of the second layer, in which only the upper part of the two-part layer comprises or consists of flake-form effect pigments. Although the process according to the invention for the production of three-dimensional patterns in coatings achieves equally good optical effects irrespective of which of the two layers (first, second, or both layer(s) of the coating) comprises the flake-form effect pigments, a process is preferred in which the first layer comprises the flake-form effect pigments and, in particular, a process in which only this first layer is applied. The first of these two last-mentioned processes offers the possibility of applying a protective layer which comprises no flake-form effect pigments to the first layer which already has an optically perceptible three-dimensional pattern, while the latter process can be carried out more economically due to the saving of a second coating operation.

In the case of the conventional coating methods already described in part above, flake-form effect pigments which are located in the respective coating composition are generally oriented virtually parallel to the coated surface, merely due to the horizontal forces acting during the coating process and due to their flake shape, in order to set the lowest possible resistance to the horizontal flows during the coating process. For this reason, it can be assumed that, in freshly applied binder-containing and optionally solvent-containing coatings which are applied to conventional, virtually flat substrates using conventional coating technologies and comprise flake-form effect pigments, the latter are usually aligned substantially parallel to the surface of the substrate in the still unsolidified coating.

The still unsolidified first layer in the process according to the invention thus, in the case where flake-form effect pigments are present, comprises the latter in substantially parallel alignment with the usually flat substrate. Due to the contact with the printing plate for a relief printing process, at least the surface of the first coating is deformed to a depth of up to 10 μm at the contact points, recesses are formed. At these contact points, the flake-form effect pigments optionally present in the first coating composition are rotated out of their parallel alignment and adopt, depending on their position within the contact point, an alignment which has a certain inclination to the surface of the coated substrate, i.e. is, for example, inclined or even perpendicular thereto. By contrast, the flake-form effect pigments which are located outside the contact points of the printing plate with the coating in the latter retain their parallel alignment. In this way, the three-dimensional imprint left in the first coating by the raised elements on the surface of the relief printing die is replicated by the flake-form effect pigments optionally present there, so that a three-dimensional pattern comprising flake-form effect pigments, which corresponds in the broader sense to the mirror image of the pattern which is embossed into the first layer by the raised elements on the printing plate, is formed. Depending on the type of flake-form effect pigments, this three-dimensional pattern then appears coloured, lustrous and/or metallic in the solidified first layer. In the broadest sense, the three-dimensional pattern which is "embossed" into the surface of the first layer and which is non-tactile only becomes visible and is thus rendered perceptible due to the rotation of the flake-form effect pigments in this layer. It has, surprisingly, been found here that even extremely slight "embossing" of the first layer is sufficient to cause considerable optically detectable changes in the alignment of the pigments in the coating. The visible three-dimensional pattern in the coating thus appears significantly more strongly than would have been expected after the slight change in shape on the surface of the first layer.

"Substantially parallel alignment" in the sense of the present invention is taken to mean both a geometrically parallel alignment of the effect pigments with the surface of the substrate to be coated (and the surface of the first layer) and also an alignment with deviations therefrom up to an angle of about 10 degrees, since the technically achievable alignment of effect pigments in coating methods often does not correspond to a strictly geometrically parallel alignment. However, the expression "parallel" is generally used below for "substantially parallel".

A second coating composition, which additionally or alternatively to the first coating composition may likewise comprise flake-form effect pigments, can optionally also be applied to the first, solidified layer. The second layer formed thereby is, in accordance with the invention, not applied to a flat substrate, but to the already pre-shaped or deformed first layer. In the case where flake-form effect pigments are located in the second coating composition, these likewise align themselves, due to the coating method, parallel to the coated surface, i.e. accordingly in tilted form to the first layer at the recesses in the first layer produced by the raised elements of the printing plate, and parallel to the surface of the first layer at all non-deformed points of this surface. In this way, a visible three-dimensional pattern can be produced by means of the flake-form effect pigments located in the second layer and/or the three-dimensional pattern from the first layer can be reinforced or supplemented by additional optical or functional effects.

In contrast to the first layer, the layer thickness of the second layer is virtually unlimited, so long as the visibility of the three-dimensional pattern from one or both layers is retained. The layer thickness of the second layer therefore does not even have to be so large that the recesses produced in the first layer by the contact with the raised elements of the printing plate are filled, resulting in a flat surface. This means that the layer thickness (dry) of the second layer may well be less than 10 µm, for example from 1 µm or 2 µm. In this case, the surface of the second layer facing away from the first layer will not be flat, but instead will likewise have recesses. These are a maximum of 10 µm deep, but preferably less than 10 µm. Such a case occurs, for example, if the bronzing method described above is selected for the application of the second layer and the second layer is itself two-part, i.e. comprises flake-form effect pigments only in the upper part of the layer. However, it is advantageous, since it is simpler to carry out, if the second layer fills the recesses present in the first layer and in addition covers the entire surface of the first layer, i.e. is greater than the depth of the recesses in the first layer. The achievable layer thicknesses are determined by the application method and are therefore generally limited only for technical reasons.

Application methods which are available for the second layer are, as already mentioned above, in principle all methods which have already been described above for the application of the first layer. In addition, however, methods such as powder coating or the bronzing method already described, in which it is not flowable coating compositions, but instead solid ones that are applied, are also suitable, since the second layer does not automatically have to have an unsolidified, still shapeable intermediate state. Instead, flake-form effect pigments applied in the case of powder coating or in the case of a bronzing method can also adopt the orientation pre-specified by the deformations in the solidified first layer. Such layers can be applied very thinly, i.e. with a thickness of a few microns.

However, the second layer is preferably likewise applied using a flexographic printing process or an offset overprint varnishing process.

The application of the second coating composition to the preferably already solidified first layer can be carried out, depending on the desired result, over the entire surface or part of the surface.

Flake-form effect pigments which can be employed in the process according to the present invention are all known flake-form effect pigments, so long as these are visible in the respective solidified layer. Flake-form effect pigments of this type are advantageously selected from the group pearlescent pigments, interference pigments, metal-effect pigments, liquid-crystal pigments, flake-form functional pigments, flake-form structured pigments, or a mixture thereof. These effect pigments are built up from one or more layers of materials, if desired different materials, and are in flake form.

These pigments preferably have a flake-form support, which optionally comprises at least one coating of a metal, metal oxide, metal oxide hydrate or mixtures thereof, a metal mixed oxide, suboxide or oxynitride, metal fluoride or a polymer.

Pearlescent pigments consist of transparent flakes of high refractive index and exhibit a characteristic pearlescence due to multiple reflection in the case of parallel alignment. Pearlescent pigments of this type which additionally also exhibit interference colours are known as interference pigments.

Although classical pearlescent pigments, such as $TiO_2$ flakes, basic lead carbonate, BiOCl pigments or nacreous pigments, are naturally also suitable in principle, the effect pigments employed for the purposes of the invention are preferably flake-form interference pigments or metal-effect pigments, which have at least one coating of a metal, metal oxide, metal oxide hydrate or mixtures thereof, a metal mixed oxide, metal suboxide, metal oxynitride, metal fluoride or a polymer on a flake-form support.

The metal-effect pigments preferably have at least one metal support or a metal coating.

The flake-form support preferably consists of natural or synthetic mica, kaolin or another phyllosilicate, glass, calcium aluminium borosilicate, $SiO_2$, $TiO_2$, $Al_2O_3$, $Fe_2O_3$, polymer flakes, graphite flakes or metal flakes, such as, for example, of aluminium, titanium, bronze, silver, copper, gold, steel or diverse metal alloys.

Particular preference is given to flake-form supports comprising mica, glass, calcium aluminium borosilicate, graphite, $SiO_2$, $Al_2O_3$ or aluminium.

The size of the flake-form support is not crucial per se. The supports generally have a thickness of between 0.01 and 5

µm, in particular between 0.05 and 4.5 µm and particularly preferably from 0.1 to 1 µm. The length or width dimension is usually from 1 to 500 µm, preferably from 1 to 200 µm and in particular from 5 to 125 µm. They generally have an aspect ratio (ratio of mean diameter to mean particle thickness) of from 2:1 to 25,000:1, preferably from 3:1 to 1000:1 and in particular from 6:1 to 250:1.

The said dimensions for the flake-form supports in principle also apply to the coated effect pigments used in accordance with the invention, since the additional coatings are generally in the region of only a few hundred nanometers and thus do not significantly influence the thickness or length or width (particle size) of the pigments.

A coating applied to the support preferably consists of metals, metal oxides, metal mixed oxides, metal suboxides or metal fluorides and in particular of a colourless or coloured metal oxide selected from $TiO_2$, titanium suboxides, titanium oxynitrides, $Fe_2O_3$, $Fe_3O_4$, $SnO_2$, $Sb_2O_3$, $SiO_2$, $Al_2O_3$, $ZrO_2$, $B_2O_3$, $Cr_2O_3$, ZnO, CuO, NiO or mixtures thereof.

Coatings of metals are preferably of aluminium, titanium, chromium, nickel, silver, zinc, molybdenum, tantalum, tungsten, palladium, copper, gold, platinum or alloys comprising these.

The metal fluoride employed is preferably $MgF_2$.

Particular preference is given to effect pigments which have a flake-form support comprising mica, glass, calcium aluminium borosilicate, graphite, $SiO_2$, $Al_2O_3$ or aluminium and at least one coating on the support, selected from $TiO_2$, titanium suboxides, titanium oxynitrides, $Fe_2O_3$, $Fe_3O_4$, $SnO_2$, $Sb_2O_3$, $SiO_2$, $Al_2O_3$, $MgF_2$, $ZrO_2$, $B_2O_3$, $Cr_2O_3$, ZnO, CuO, NiO or mixtures thereof.

The effect pigments can have a multilayered structure in which a plurality of layers, which preferably consist of the above-mentioned materials and have different refractive indices in such a way that in each case at least two layers of different refractive index are located alternately on the support, where the refractive indices in the individual layers differ by at least 0.1 and preferably by at least 0.3 from one another, are located one above the other on a metallic or non-metallic support. The layers located on the support here may be either colourless or coloured, predominantly transparent, semi-transparent or even opaque.

Depending on the support material used and the type of layers applied, the effect pigments obtained are thus also colourless or have a mass tone, or are predominantly transparent, semi-transparent or opaque. Due to the single- or multilayered system on the support, however, they are additionally capable of producing more or less intense and lustrous interference colours.

The so-called LCPs (liquid crystal polymers), which consist of crosslinked, oriented, cholesteric liquid crystals, but also polymer or metal flakes known as holographic pigments, can likewise be employed as effect pigments.

The effect pigments described above may be present individually or as a mixture of two or more in the coating compositions employed in accordance with the invention. They may likewise be employed in a mixture with organic and/or inorganic dyes or coloured pigments and/or also in mixtures with uncoated mica. The proportion by weight of the flake-form effect pigments in the respective binder-containing coating compositions is generally between 1 and 35 percent by weight and preferably between 5 and 25 percent by weight, based on the total weight of the coating composition.

Effect pigments which can be employed are, for example, the commercially available functional pigments, interference pigments or pearlescent pigments offered by Merck KGaA under the names Iriodin®, Colorstream®, Xirallic®, Miraval®, Ronastar®, Biflair®, Minatec®, Lustrepak®, Colorcrypt®, Colorcode® and Securalic®, Mearlin® from Mearl, metal-effect pigments from Eckart and optically variable effect pigments, such as, for example, Variochrom® from BASF, Chromafflair® from Flex Products Inc., Helicone® from Wacker, holographic pigments from Spectratec and other commercially available effect pigments.

The individual colour and/or lustre effects which can be achieved by the effect pigments are not crucial per se for the success of the present invention. Rather, the success according to the invention is achieved by the change in the optically perceptible effect of the flake-form effect pigments at the points of the coating which come into contact with the raised elements of the relief printing plate in accordance with the process according to the invention and are thus rotated out of their parallel alignment with the surface of the substrate. A three-dimensional pattern is produced in the coating here and is perceptible via the optical effects rendered visible by the effect pigments. The visible three-dimensional pattern here is significantly more pronounced than would have been expected from the actual deformation of the coating, since rotation of the flake-form effect pigments out of the parallel position, even by only a few angle degrees, already results in a significant change in their reflection properties.

Naturally, however, preference is given to the use of effect pigments with which it is possible to achieve visually very attractive print results which cannot be obtained with classical organic or inorganic dyes or coloured pigments alone. Thus, especially in packaging printing, lustrous, intense interference colours, metallic effects or print images which exhibit a colour play and/or impressive light/dark effects on tilting (optically variable prints) are highly valued. The sparkle effect of the print images here is often greater, the larger the particle size of the effect pigments. Colour and lustre impressions of this type can only be achieved with flake-form effect pigments.

If the flake-form effect pigments employed exhibit an optically variable behaviour, this is of course not only perceptible in the patterned coating produced in accordance with the invention if the viewing angle is changed relative to the entire coated surface, but also even on viewing of the coating deformed by the printing plate from a single viewing angle, so that the three-dimensional pattern produced appears in different colours and/or different degrees of brightness.

The flake-form effect pigments can also be employed in a mixture with other non-flake-form pigments so long as the proportion of flake-form effect pigments is sufficiently large that a three-dimensional pattern produced therewith is still visible in the coating. For this purpose, the proportion of flake-form effect pigments in a coating composition comprising them should correspond to at least 50%, but preferably at least 70% of the total pigment loading of the respective coating composition.

Besides the flake-form effect pigments, the coating composition for the first layer also comprises at least one binder and optionally at least one solvent and optionally one or more assistants.

Suitable binders for coating compositions are in general conventional binders, in particular those based on nitrocellulose, polyamide, acrylic, polyvinylbutyral, PVC, PUR or suitable mixtures thereof, and in particular binders on a UV-curable basis (free-radical or cationic curing). It is obvious that, for the process according to the invention, binders are selected for the first coating composition and, if appropriate, also for the second coating composition, but in any case for the coating composition comprising the flake-form effect pigments, which are transparent after solidification of the corresponding layer, so that the three-dimensional pattern formed by the alignment of the flake-form effect pigments is optically detectable in the solidified layer.

If an effect pigment-free protective layer is to be applied to a layer of this type, this likewise comprises a binder which is transparent after solidification. The corresponding binders are familiar to the person skilled in the art.

Furthermore, the coating composition for the first layer optionally also comprises at least one solvent which consists of water and/or organic solvents or of organic solvent mixtures.

Organic solvents which can be used are all solvents usually used in the said coating methods, for example branched or unbranched alcohols, aromatic compounds or alkyl esters, such as ethanol, 1-methoxypropanol, 1-ethoxy-2-propanol, ethyl acetate, butyl acetate, toluene, etc., or mixtures thereof.

Likewise, generally customary additives, such as fillers, further coloured pigments or dyes, for example carbon black, UV stabilisers, inhibitors, flameproofing agents, lubricants, dispersants, redispersants, antifoams, flow-control agents, film formers, adhesion promoters, drying accelerators, drying retardants, photoinitiators, etc., can be added to the coating composition.

The coating composition for the second layer may have a similar composition to the first layer with respect to the binders, solvents and assistants. However, since the second layer, in contrast to the first layer, does not necessarily have to have a plastic, unsolidified state, the coating composition for the second layer may also merely consist of a pigment powder comprising flake-form effect pigments or of a conventional powder-coating composition which comprises flake-form effect pigments.

It goes without saying that the specific material composition of the respective coating composition and the viscosity thereof are dependent on the type of coating method selected and the respective material to be printed. The solids content of the coating composition is adjusted here, depending on the method used, coating temperature, coating speed and type of binders, additives and type of material to be printed, in such a way that the viscosity of the coating composition is sufficient in order to achieve the best-possible transfer of the coating composition from the respective coating apparatus to the material to be printed or to the first layer. This adjustment of the viscosity is carried out directly on the coating machine and can be carried out without inventive step based on the coating composition manufacturer's instructions or the expert knowledge of the printer or coating expert. The viscosity is generally determined by determining the efflux time at standard temperature and a particular relative atmospheric humidity in a standardised flow cup (for example DIN 4 flow cup from Fritz Arndt "Frikmar" KG, Germany, or from Erichsen GmbH & Co. KG, Germany) or by measurement using a rheometer (for example from Brookfield E.L.V. GmbH, Lorch, Germany).

The first, but particularly preferably both the first coating composition and the second coating composition, is preferably applied to the respective substrate by means of a flexographic printing process or an offset overprint varnishing process. Conventional flexographic printing plates and printing machines or offset overprint varnishing machines are employed here. Since the achievable wet layer thickness in the flexographic printing process is relatively small, namely only about 2 to 6 µm, the depths subsequently achieved in this layer by the relief printing die on use of a process of this type for the production of the first layer are in practice smaller or at most precisely as deep as the wet layer thickness of the layer, namely in the range from about 2 to 6 µm. An analogous situation applies in the offset overprint varnishing process, but somewhat greater wet layer thicknesses can be achieved here.

As a particular technical advantage of the process according to the invention, it has been found that all coating and embossing steps, namely both the application of the first coating composition and optionally also the second coating composition and also the deformation of the first coating by a relief printing plate, can be carried out by means of flexographic printing processes or flexographic printing plates or correspondingly in the offset overprint varnishing process. This facilitates the production of a three-dimensional pattern within a single flexographic printing line (alternatively offset overprint varnishing, for which flexographic printing plates are likewise usually employed in the varnishing machines), without the need for particular technical adaptation work or additional machine investment.

It is also of particular advantage that radiation-curing binder systems, which are cured, for example, by UV rays or electron beams, can be used both for the first layer and also optionally for the second layer. Such systems require little or even no volatile solvents and cure virtually immediately under irradiation. The first layer deformed by the contact with the relief printing plate can therefore be cured within an extremely short time either immediately after removal of the relief printing plate or also some time after the relief printing plate has already been removed from the first layer. This enables quick subsequent additional coating as well as possible immediate further processing or storage of the coated surfaces provided with the three-dimensional pattern. The first layer at least is preferably solidified by means of UV radiation, but particularly preferably the first layer and the second layer, if the latter is present.

As already described above, the deformation of the first layer is carried out with the aid of a die for relief printing, i.e. a printing plate for letterpress printing, letterset printing or flexographic printing. These are flat printing plates or printing cylinders. The conventional printing plates can be employed. The raised pattern on these printing plates determines the desired three-dimensional pattern in the first layer of the coating produced in accordance with the invention. The two-dimensional shape of the raised surface of the printing plate determines the geometrical shape of the pattern in the first layer (mirror image), while the height of the raised elements on the printing plate determines the maximum penetration depth thereof into the first layer. It should be emphasised here that conventional printing plates for relief printing usually have raised elements which have a significantly greater height than the desired penetration depth of these plates into the first layer. It should therefore be ensured when carrying out the process according to the invention that the penetration depth of the relief printing plate into the first layer does not exceed 10 µm. This is achieved by contact of the printing plate with the first layer over the entire surface, but with a low contact pressure and a specifically controlled low penetration depth, analogously to a so-called kiss-coating or kiss-printing process.

Printing plates which have proven particularly suitable for carrying out the second step of the process according to the invention (production of the recesses in the first layer) are those usually produced for flexographic printing processes. Such printing plates are, in addition, also suitable for use in offset overprint varnishing processes. The printing plates usually used here have surfaces of rubber, elastomers or photo-polymers, into which raised elements, the so-called print image relief, are incorporated for the transfer of image dots or line and/or image elements. For the usability in the process according to the invention, it is initially fairly unimportant whether the print image relief here is produced by means of laser engraving or via a photographic/chemical process. In principle, all flexographic printing plates produced by conventional processes are suitable for use as printing plate for relief printing for the production of recesses in the first layer in the process according to the invention. Flexographic printing plates produced for conventional flexographic printing processes, in particular for halftone printing processes, preferably have print dots on the print image relief which are provided with sharp outer edges and are anchored on the printing plate with steep flanks. This achieves precise transfer of the desired print dots in the flexographic printing process, with the print image hardly changing its outer shape at all, even with increasing abrasion of the printing plate. If printing plates of this type are employed in the second step of the process according to the invention as printing plate for a relief printing process, the recesses of an individual image dot produced in the first layer likewise have sharp outer edges and a virtually cylindrical shape. Sharp outer edges and steep flanks are likewise obtained if, instead of the individual image dots, uninterrupted image and/or line elements are applied to the flexographic printing plate by conventional methods for the structuring of flexographic printing plates. With both forms, three-dimensional patterns which likewise have clearly structured outer shapes are obtained via the corresponding rotation of the flake-form effect pigments in the layer comprising them.

For certain applications, however, it is advantageous for the three-dimensional patterns produced to have more subtle and softer outer shapes. Such patterns very strongly resemble, for example, the three-dimensional patterns which can be achieved by magnetic alignment of flake-form magnetic pigments and generally have very soft shapes with fluid transitions. For the production of three-dimensional patterns of this type by means of the process according to the invention, it is therefore preferred for the printing plate employed for a relief printing process to be flexographic printing plates, on the surface of which uninterrupted image and/or line elements are arranged, which themselves have rounded-off outer edges. These raised image and/or line elements on a flexographic printing plate have, in one embodiment, a planar surface and side flanks in which the transition from the planar surface to the side flank has the shape of an arc, whose length is selected from the length of an arc formed over a mid-point angle in the range from 10° to 90°, where the corresponding radius of the circle is between 0.1 and 50 µm.

In a further embodiment, these image and/or line elements have a cross section which corresponds to a circle segment, where the segment height corresponds to a maximum of 50 µm and the radius of the corresponding circle is in the range from about 100 to 2000 µm, preferably from 100 to 1000 µm.

Flexographic printing plates of this type can be obtained by means of a particular exposure technology using photopolymer printing plates.

The present invention also relates to a coating on a substrate which has a three-dimensional pattern and consists of a first layer and optionally a second layer located thereon, in each case solidified or solid, where at least one of the layers comprises flake-form effect pigments, where the first layer has on its upper side, which optionally represents the interface to the second layer, recesses which are not deeper than 10 µm.

A coating of this type having a three-dimensional pattern is obtainable by the process according to the invention described above.

As already described above, the flake-form effect pigments may optionally be present in the first layer, the second layer, or also in both layers. Preference is given to the embodiment in which the flake-form effect pigments are present in the first layer and the second layer is optionally a binder-containing protective layer with no effect pigments or is not present at all.

In the layer of the coating according to the invention which comprises the flake-form effect pigments, these are present in parallel alignment with the surface of the substrate at the points at which the first layer has no recesses, whereas they have been rotated out of their parallel alignment at the points at which the first layer is provided with recesses and are thus present in the solid or solidified layer oriented at an angle to the substrate surface. The alignment here can be at an acute, steep or right angle to the substrate surface. This alignment of the flake-form effect pigments results in a modified optical behaviour of the effect pigments at the relevant points, in particular with respect to their light-reflecting properties, their lustre and/or their brightness. A modified optical image which appears to have a three-dimensional structure is thus perceptible for the viewer, who generally views the coating from the perpendicular or from a steep angle. As already described above, the three-dimensional structure perceived in the coating according to the invention is significantly more clearly defined than the actual three-dimensional deformation of the surface of the first layer by recesses which have a maximum depth of 10 µm.

The low depth of these recesses is also the reason why they are non-tactile to humans, for example with fingers or hand surfaces. This means that, even in the case of a coating according to the invention which only consists of a single layer, the surface of the solidified coating is perceived by touch as non-deformed, while a three-dimensional pattern that appears by means of the variously oriented flake-form effect pigments in the layer is optically perceptible. Soiling of the surface due to deposition of dirt in the recesses is therefore practically excluded. In addition, a certain counterfeiting security is present, since the production process cannot readily be deduced via pure observation and tactile examination of the coated substrate.

Suitable substrates for the production of the coating according to the invention are a multiplicity of substrates, as is usually employed for the production of a very wide variety of decorative products and security products.

The term decorative product in the sense of the present invention encompasses a broad range of packaging materials, stationery products, speciality papers, textile materials, decoration materials, advertising materials, teaching materials, joke articles, gift articles, furniture coating films or papers, wallpapers, but also materials for the functional coating and/or artistic decoration of buildings or building parts, highways, signs, vehicles and aircraft, art objects and the like.

Security products in the sense of the present invention are regarded as being, for example, labels, admission tickets, travel tickets, passports, identity documents, banknotes, cheques, credit cards, shares, stamps, chip cards, driving licences, certificates, test certificates, revenue stamps, tax stamps, vehicle licence plates, toll fee stickers, MOT stickers, particulates stickers or seals, to mention only typical products.

Accordingly, the substrates used in accordance with the invention consist of materials such as paper, cardboard, wallpapers, laminates, tissue materials, wood, metals, in particular metal foils, polymers, in particular polymeric films, security printing products or materials which comprise constituents of a plurality of these substances. As usual in the case of papers and polymer films, the substrate may optionally also have been electrostatically pretreated and/or provided with a primer layer and/or another anchoring layer. The papers employed can therefore be, for example, uncoated, coated or also satinised papers or papers which have a coloured anchoring layer.

Substrate materials of this type can be coated using usual coating methods, in particular the majority also using conventional printing processes, also provided with recesses in the first layer via the use of dies for relief printing.

Particular preference is of course given to substrate materials that are usually also coated by means of printing processes in large runs and via continuous processes, i.e. all types of papers and cardboards as well as polymer films or metal foils and composite materials comprising two or more thereof.

The present invention also relates to a product which has a surface which has a three-dimensional pattern in a coating on a substrate made of paper, cardboard, wallpaper, a laminate, a tissue material, wood, a polymer, a metal, a polymeric film, a metal foil, a security printing product or made of a material which comprises constituents of a plurality of these substances, and where the substrate has optionally been electrostatically pretreated and/or provided with a primer layer and/or another anchoring layer, and where the coating has at least one first layer and optionally additionally a second layer, where the first layer and/or the second layer comprises flake-form effect pigments, and where the first layer has recesses which are not deeper than 10 μm.

Such products are obtainable by the process according to the invention described above and have the three-dimensional patterns described in greater detail above.

The present invention also relates to the use of the products produced by the process according to the invention as or for decoration materials or security products. Details in this respect have likewise already been described above.

It is a particular advantage of the present invention that, with the process according to the invention, a process is available for the production of three-dimensional patterns in coatings which can be employed without major additional equipment and technical complexity for the production of three-dimensional patterns in coatings which comprise flake-form effect pigments. Since explicit embossing dies are not used, significant deformation of the applied layers or even of the substrates does not occur, which both reduces the equipment complexity and also helps to avoid possible subsequent soiling of the end products by dirt deposits in the recesses. Since all possible types of flake-form effect pigment can be employed in the coatings, a very wide variety of optical designs are also possible in the cases where otherwise only magnetically alignable pigments could be employed without substrate embossing occurring at the same time. The flowing and soft three-dimensional optical images obtainable on use of magnetically alignable pigments are also obtainable by means of the process according to the invention, without having to employ magnetically alignable flake-form pigments and the corresponding complex equipment. Furthermore, the process according to the invention can be incorporated with virtually no problems into existing printing operations, and here in particular into flexographic printing processes or offset overprint varnishing processes. The rapid and reproducible production of decorative mass-produced articles or security documents is therefore possible in a simple and inexpensive manner by means of the process according to the invention.

The invention will be explained in greater detail below with reference to examples and figures, but will not be restricted thereto.

Figure 1:
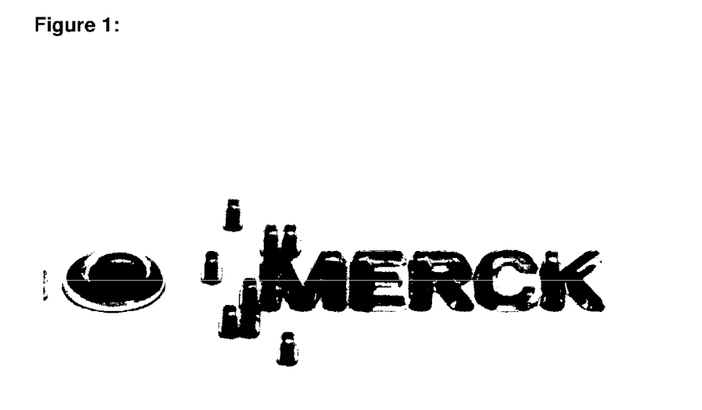
FIG. 1 shows a mirrored motif on a conventional relief printing plate (flexographic printing plate) which can be employed for the production of recesses in the layer by the process according to the invention
Figure 2:
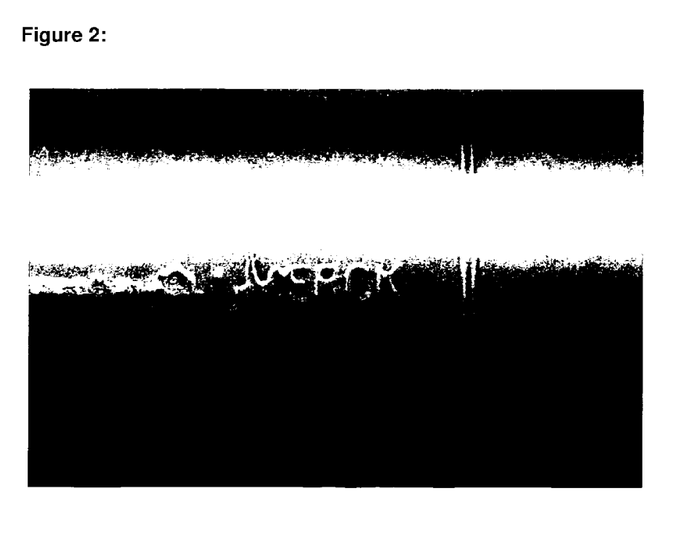
FIG. 2 shows a coating according to the invention having a three-dimensional pattern, produced using a flexographic printing plate corresponding to FIG. 1

A commercially available paper substrate ("Hello Silk", 200 g/m$^2$, Sappi Stockstadt GmbH, Germany) is coated by means of a conventional printing machine of the Heidelberger Speedmaster CD DUO LY6LLYY type with double coater and upstream print unit, as follows:

Firstly, the substrate is provided with a coloured anchoring layer over the entire surface in an upstream print unit (Pantone® Grau 425 C in a HiBryte® Pro printing ink from SUN Chemical). The pre-coated substrate is subsequently coated over the entire surface in a first coater [conventional CL4 printing plate from DuPont, Vegra VP 1038/50 printing varnish with a pigment content of 20% by weight [Iriodin® 103 (particle size 10-60 μm) and Iriodin® 123 (particle size 5-25 μm), 1:1 mixture, manufacturer Merck KGaA], print viscosity 50 s (DIN 4 flow cup from Erichsen), anilox roller from Praxair (20 g/cm$^3$, 80 L/cm$^2$, engraving: ART®)]. The thickness of the resultant wet layer here is about 10 μm. The not yet solidified varnish surface is brought into contact with a further coating plate in a second coater. This coating plate (CL4, thickness 1.14 mm, manufacturer DuPont, exposed in accordance with the manufacturer's instructions, enlarged mirrored detail in FIG. 1) is not coated with printing ink. It has been provided with line motifs, such as texts, pictograms and lines in various sizes. The penetration depth of the print relief into the first coating layer is a maximum of 10 μm. The resultant print layer is solidified in a conventional UV dryer. The print image obtained has readily visible three-dimensional patterns in the form of the line motifs located on the printing plate employed in the second coater, on a silver-grey shimmering background. A detail of the solidified coating is depicted in FIG. 2. The three-dimensional pattern cannot be felt by touching with a finger.

Example 2

Figure 3:
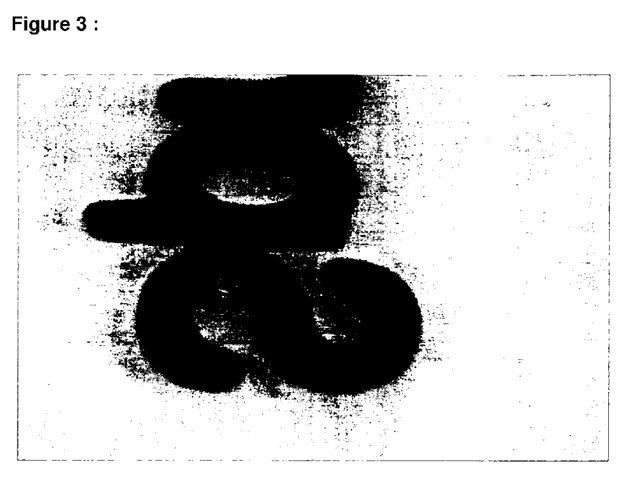
FIG. 3 shows a flat print profile with rounded-off transitions to the flanks of the motifs on a flexographic printing plate, obtained by a particular exposure method.
Figure 4:
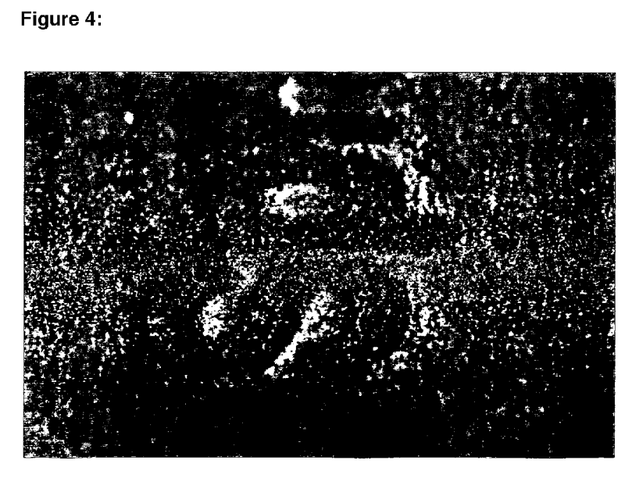
FIG. 4 shows a coating according to the invention having a three-dimensional pattern, produced using a flexographic printing plate corresponding to FIG. 3
Figure 5:
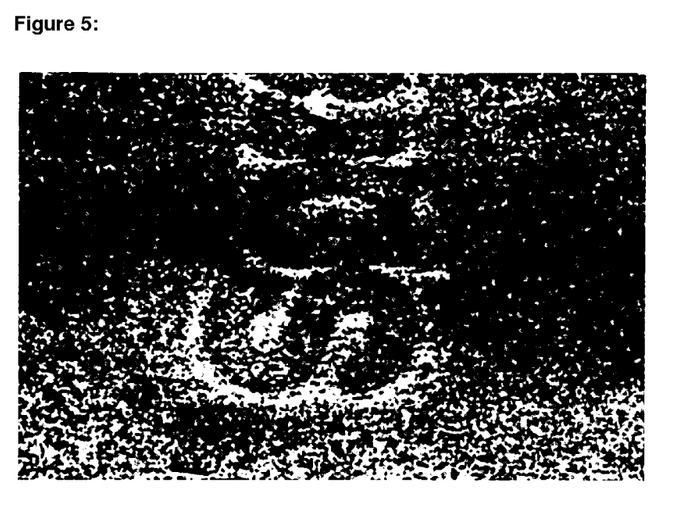
FIG. 5 shows the coating according to the invention from FIG. 4, photographed with greater contrast for better visualisation of the three-dimensional structure achieved Example 1

Example 1 is repeated, with the modification that a coating plate (CL4 from DuPont, see Example 1) which is exposed by a particular exposure method (reverse-side exposure for the socket (100 s) and for the relief (250 s), enlarged detail in FIG. 3) is employed for the second coater instead of a flexographic printing plate exposed by the usual method. The three-dimensional pattern obtained in the coating is depicted in FIGS. 4 and 5. The three-dimensional pattern is clearly perceptible with a soft, rounded-off appearance in the silver-grey shimmering coating, but cannot be felt.

The invention claimed is:

1. A process for the production of three-dimensional patterns in coatings, comprising applying a flowable coating composition to a substrate with formation of a first layer, and contacting the first layer in an unsolidified state with a die which has a surface with raised elements in such a way that the raised elements of the die produce recesses in the first layer, removing the die, and optionally coating the first layer containing recesses with a second coating composition with formation of a second layer, where at least one of the coating compositions comprises flake-form effect pigments, the die is a printing plate for a relief printing process and is a letterpress printing plate, a letterset printing plate or a flexographic printing plate, the recesses in the first layer are not deeper than 10 µm and the layer(s) is (are) solidified.

2. The process according to claim 1, comprising applying a first layer and a second layer, and solidifying the first layer containing recesses before application of the second layer.

3. The process according to claim 1, comprising applying a first layer and a second layer, and solidifying the first layer containing recesses and the second layer simultaneously.

4. The process according to claim 1, wherein the die is a flexographic printing plate.

5. The process according to claim 1, wherein the first layer comprises flake-form effect pigments.

6. The process according to claim 1, wherein the second layer comprises flake-form effect pigments.

7. The process according to claim 1, comprising applying the first layer and/or second layer are applied by means of a printing process.

8. The process according to claim 7, wherein the printing process is a gravure printing process, a screen printing process, paper coating process, a flexographic printing process, a pad printing process, an offset printing process, an offset overprint varnishing process or bronzing process.

9. The process according to claim 1, comprising applying the first layer and/or second layer by a flexographic printing process or an offset overprint varnishing process.

10. The process according to claim 1, comprising solidifying the first layer and/or second layer by means of UV radiation.

11. The process according to claim 1, wherein the flake-form effect pigments are pearlescent pigments, interference pigments, metal-effect pigments, liquid-crystal pigments, flake-form functional pigments, flake-form structured pigments, or a mixture thereof.

12. A coating on a substrate which has a three-dimensional pattern and comprises a first layer and optionally a second layer located thereon, in each case solidified or solid, where at least one of the layers comprises flake-form effect pigments, where the first layer has on its upper side recesses which are not deeper than 10 µm and where the coating is obtainable by a process according to claim 1.

13. The coating according to claim 12, wherein the recesses present in the solidified first layer are not perceptible by touch by humans.

14. The coating according to claim 12, where the substrate is paper, cardboard, wallpaper, a laminate, a tissue material, wood, a polymer, a metal, a security printing product or a material which comprises constituents of a plurality of these substances, and where the substrate has optionally been electrostatically pretreated and/or provided with a primer layer and/or another anchoring layer.

15. A product which has a surface which has a three-dimensional pattern, produced by a process according to claim 1, in a coating on a substrate made of paper, cardboard, wallpaper, a laminate, a tissue material, wood, a metal, a polymer, a security printing product or made of a material which comprises constituents comprising a plurality of these substances, and where the substrate has optionally been electrostatically pretreated and/or provided with a primer layer and/or another anchoring layer.

16. The product according to claim 15 which is a decoration material or security product.

17. The coating according to claim 14, wherein the polymer is a polymeric film and the metal is a metal foil.

18. The product according to claim 15, wherein the polymer is a polymeric film and the metal is a metal foil.

* * * * *

UNITED STATES PATENT AND TRADEMARK OFFICE
CERTIFICATE OF CORRECTION

| | | |
|---|---|---|
| PATENT NO. | : 8,993,103 B2 | Page 1 of 1 |
| APPLICATION NO. | : 13/994464 | |
| DATED | : March 31, 2015 | |
| INVENTOR(S) | : Peter Clauter et al. | |

It is certified that error appears in the above-identified patent and that said Letters Patent is hereby corrected as shown below:

Claims

Column 17, Line 29, claim 7 reads: "the first layer and/or second layer are applied by means of a"
should read -- the first layer and/or second layer by means of a --.

Signed and Sealed this
Thirteenth Day of October, 2015

Michelle K. Lee
*Director of the United States Patent and Trademark Office*